(12) United States Patent
Daw et al.

(10) Patent No.: US 12,257,618 B1
(45) Date of Patent: Mar. 25, 2025

(54) APPARATUS AND METHOD FOR CLOSING DUCT SEAMS AND FOR INSERTING ANGLE PLATES AND CLOSING DUCT SEAMS

(71) Applicant: HVAC Inventors/Systemation, Inc., Port St. Lucie, FL (US)

(72) Inventors: David E. Daw, Port St. Lucie, FL (US); John T. Ehling, Edison, NJ (US)

(73) Assignee: HVAC Inventors/Systemation, Inc., Port St. Lucie, FL (US)

( * ) Notice: Subject to any disclaimer, the term of this patent is extended or adjusted under 35 U.S.C. 154(b) by 0 days.

(21) Appl. No.: 18/896,191

(22) Filed: Sep. 25, 2024

Related U.S. Application Data (60) Provisional application No. 63/540,263, filed on Sep. 25, 2023.

(51) Int. Cl.
*B21D 39/02* (2006.01)
*B21D 51/06* (2006.01)
*B23P 19/00* (2006.01)
*F24F 13/02* (2006.01)

(52) U.S. Cl.
CPC ........... *B21D 39/023* (2013.01); *B21D 51/06* (2013.01); *B23P 19/006* (2013.01); *F24F 13/0245* (2013.01)

(58) Field of Classification Search
CPC ............ B21D 39/02–025; B23P 19/04; B23P 19/005; B23P 19/004; B23P 19/001; B23P 19/006; F24F 13/0245; Y10T 29/53552; Y10T 29/53709; Y10T 29/53961; Y10T 29/53826; Y10T 29/5383; Y10T 29/53787; Y10T 29/53791; Y10T 29/54
See application file for complete search history.

(56) References Cited

U.S. PATENT DOCUMENTS

| | | | |
|---|---|---|---|
| 9,027,376 B2 * | 5/2015 | Daw | B23P 11/005 |
| | | | 72/178 |
| 2013/0104614 A1 * | 5/2013 | Foster | B21B 27/02 |
| | | | 72/51 |

* cited by examiner

*Primary Examiner* — Tyrone V Hall, Jr.
(74) *Attorney, Agent, or Firm* — Breiner & Breiner, L.L.C.

(57) ABSTRACT

Apparatus and methods are described for automatically closing the seam of duct work and for automatically inserting angle plates into duct work and then closing the seam of the duct work. The seam closing apparatus includes a first seam closing members for closing the top and bottom portions of the seam and a second seam closing member for closing the remainder of the seam of the duct work.

36 Claims, 10 Drawing Sheets

APPARATUS AND METHOD FOR CLOSING DUCT SEAMS AND FOR INSERTING ANGLE PLATES AND CLOSING DUCT SEAMS

RELATED APPLICATION

This application claims benefit of U.S. Provisional Application Ser. No. 63/540,263, filed Sep. 25, 2023, entitled "Apparatus And Method For Closing Duct Seams And For Inserting Angle Plates And Closing Duct Seams," and which application is incorporated herein by reference in its entirety

FIELD OF THE INVENTION

The present invention relates to an apparatus and method for closing seams of duct work and for an apparatus and method for automatically inserting angle plates into duct work and seaming the duct work.

BACKGROUND OF THE INVENTION

Rectangular or box shaped ducts are extensively used in heating and ventilating systems to distribute heated or cooled air throughout the structure. These ducts are commonly formed from different gauges of sheet metal in sections of predetermined length which are then connected to form a continuous duct for distributing air. Each section of duct is formed by bending two pieces of sheet metal of the desired length at a ninety degree angle and with the Pittsburgh type seam one edge of each piece is formed with a longitudinally extending groove to form the female portion of the joint while the other edge is bent over along its length to form the male portion of the joint. The two parts are then assembled by inserting the male portion of each part into the female portion leaving an edge extending beyond the joint from the female portion, which edge must then be bent over to lock the seam. Apparatus are known in which to automatically close the duct seam, including a Pittsburgh seam, including the commercial apparatus sold by the Iowa Precision Industries Division of Mestek Machinery, Inc. ("IPI") under the trademark WHISPER-LOC®. The WHISPER-LOC® machine has been commercially successful in the marketplace for automatically seaming duct work. Such apparatus are also disclosed in IPI's U.S. Pat. Nos. 5,189,784, issued Mar. 2, 1993, and U.S. Pat. No. 5,243,750, issued Sep. 14, 1993, and Engel Industries, Inc.'s U.S. Pat. No. 5,353,616, issued Oct. 11, 1994, the disclosures of these patents are incorporated in their entirety herein by reference. When seaming duct work using the WHISPER-LOC® machine or the apparatus and methods disclosed in these patents, the duct must be inserted into the machine in a specific orientation to close the seam.

There is also disclosed in the art an apparatus and method for seaming a Pittsburgh seam in a vertical apparatus wherein the seam is said to be completed regardless of the orientation of the male and female portions of the Pittsburgh seam as disclosed in U.S. Pat. Nos. 9,375,776; 9,511,409; 9,623,472; 9,889,489; 10,160,227; 10,612,812; 10,976,071; and 11,313,578, to Vicon Machinery LLC, the disclosures of which are incorporated in their entirety herein by reference.

Additionally, apparatus and methods for placement of angle plates in transverse duct flanges are known and disclosed in Systemation, Inc.'s U.S. Pat. Nos. 5,283,944; 5,321,880; and 5,342,100, the disclosures of these patents being incorporated in their entirety herein by reference. Commercial apparatus using the inventions of these patents have been sold under the trademark CORNERMATIC® by IPI. These machines have been commercially successful and have transformed the industry with respect to the insertion of angle plates into duct work. Additionally, U.S. Pat. No. 5,926,937 discloses a mobile apparatus for placement of angle plates in transverse duct flanges, the disclosure therein being incorporated in its entirety herein by reference. This latter patented technology has been manufactured commercially by IPI and sold under the trademark CORNER CADET®.

The CORNERMATIC® and CORNER CADET® apparatus and methods have been commercially successful. They have saved the industry substantial time and money and made the insertion of angle plates into ducts substantially easier for sheet metal fabricators, including saving wear and tear on the human body. However, the CORNERMATIC® and CORNER CADET® machines usually cannot accept irregular shaped duct fittings referred to in the industry and herein as "fittings." As such, workers must manually insert the angle plates into the fittings.

Systemation solved this problem with respect to the automatic insertion of angle plates into irregular shaped duct fittings as seen in its U.S. Pat. Nos. 8,875,388; 9,151,513; and 9,937,592, which are incorporated herein by reference in their entirety. The machines are now being sold by Mestek Machinery, Inc. ("Mestek") under the trademark CORNERMATIC PLUS®. This new apparatus includes novel features and improvements over the CORNERMATIC® and CORNER CADET® machines including, but not limited to, (1) a new apparatus for the automatic insertion of angle plates into duct flanges, including fittings; (2) a new clamp for clamping duct flanges; (3) a new supply hopper located out of the area of operation; (4) a new presser for pressing the angle plates into the duct flanges; (5) a new package for angle plates; and (6) combinations of the above and other features.

Additionally, there is disclosed in U.S. Pat. Nos. 9,545,695 and 9,377,213 a new packaging for the angle plates which packages include a plurality of angle plates, including eighty angle plates, which may be inserted directly into the hopper, thereby saving the time and expense associated with the manual insertion of the angle plates in limited numbers, which patents are incorporated herein by reference in their entireties. The packaging may include a plurality of angle plates contained in a self-contained package and sold by Ductmate Industries, Inc. under the trademark STRAP-PAK®.

Additionally, Systemation solved the need in the market for a single machine which will automatically insert angle plates into a piece of duct and will automatically close the seam of the piece of duct as disclosed in Systemation's U.S. Pat. Nos. 9,027,376 and 9,157,653, which patents are incorporated herein by reference in their entirety. Mestek is manufacturing and selling machines under these patents under the trademark CORNERMATIC® Combo Corner Inserter and Seam Closer. These machines have been commercially successful and have saved contractors substantial time and expense. For example, these machines save the expense to contractors of having to have two machines in their shop to automatically insert angle plates and to close a seam; save space in a manufacturer's shop by eliminating the need for two machines when one machine will do the same job; save contractors time as the single machine will accomplish that of two machines in a shorter period of time and, therefore, save labor costs; and makes the manufacture of duct easier and more efficient.

While the above apparatus has been beneficial to the industry in saving time and expense of seaming the Pittsburgh seam, and saved workers substantial manual labor, the machines will not close the seams at the top four to five inches and the bottom four to five inches of the duct. Accordingly, workers must first hammer the seams closed at the top and bottom of the duct before inserting the duct into the WHISPERLOC® seam closer or into the CORNERMATIC® Combo Corner Inserter and Seam Closer. It would be useful to contractors to have a seam closer machine which will close the entire Pittsburgh seam from top to bottom and eliminate the need for a worker to first close the top and bottom portions of the Pittsburgh seam. This will save time and expense for a contractor and the wear and tear on a worker. The present invention solves this problem.

SUMMARY OF THE INVENTION

The present invention comprises an apparatus and a methods for (1) automatically closing the seam of duct work, e.g. a Pittsburgh seam and (2) automatically inserting angle plates into duct work and automatically closing the seam of the duct work, e.g. a Pittsburgh seam.

The apparatus and method for automatically closing a Pittsburgh seam may be similar to the CORNERMATIC® Combo Machine without the corner insertion components but will also include a bender at the top and bottom of the apparatus to first close the top and bottom four to five inches of the seam which cannot be done by the apparatus currently on the market.

The apparatus of the present invention for automatically inserting angle plates into duct work and automatically closing the seam of the duct work is similar to the CORNERMATIC® Combo Machine but will also include a bender at the top and bottom of the apparatus to first close the top and bottom four to five inches of the seam which cannot be done by the apparatus currently on the market. More specifically, the apparatus comprises a platen for receiving a duct and an assembly for automatically inserting angle plates into the duct and an assembly for automatically closing the seam of the duct. The assembly for automatically inserting the angle plates into the duct may be substantially the same or similar in part to that disclosed in Systemation's U.S. Pat. Nos. 5,283,944 and 9,027,376 and which disclosures have been incorporated in their entirety herein by reference. The assembly comprises an adjustable dual head, namely a lower head and an upper head, for concurrently inserting angle plates at the lower and upper ends of the duct. The upper head is vertically adjustable to accommodate different sizes of duct. Such assemblies may include a clamp member or clamp members for clamping the duct into position on the platen; a feed member for feeding an angle plate into place in the duct flange; a press member or press members for pressing an angle plate into the flange; an angle plate supply hopper for receiving a plurality of angle plates, preferably in a STRAP-PAK® package, or other assembly for supplying angle plates to the feed member; and crimper members for crimping the duct flange after the angle plate has been inserted into the duct flange.

In a presently preferred embodiment of the invention, the angle plates will first be inserted into the duct work prior to closing the seam of the duct. This is the opposite of what was previously done in the industry. Specifically, the industry practice was to use the WHISPER-LOC® machine to automatically close the Pittsburgh seam and then to use the CORNERMATIC® machine to automatically insert angle plates. It has been found with the apparatus and method of the CORNERMATIC® Combo Machine that by inserting the angle plates first, this will straighten and square the duct and allow for an easier closing of the seam in the duct.

The seam closing assembly of the present invention includes a bender at the top of the apparatus and a bender at the bottom of the apparatus for first closing the top four to five inches of the Pittsburgh seam and the bottom four to five inches of the Pittsburgh seam; a seaming carriage having a horizontal bar and carrier with seam forming members; a pair of linear rails upon which the seam closing carriage moves up and down; a pair of endless chain drives for moving the carriage by, for example, an electric motor; the carrier includes a housing connected to the horizontal bar having seam forming members which may comprise first, second and third rollers, in vertical orientation, connected to the carrier. The first roller will begin the seam closing by bending the edge portion of the female member of the Pittsburgh seam and the second and third rollers will complete the closure by bending the edge member to close the seam. Alternative seam forming members may also be used without departing from the scope of the invention, such as cam followers as used in the WHISPERLOC® machine and in some CORNERMATIC® Combo Machines. In some embodiments, the seam closing assembly will close the seam of the duct no matter of the orientation in which the duct is inserted into the apparatus.

Accordingly, the apparatus of the invention may comprise a combination angle plate inserter machine and seam closer machine for automatically inserting angle plates into a duct and closing a seam of a duct. The apparatus may include a dual head assembly having an upper head and a lower head wherein each head includes (1) a platen for receiving a duct; and (2) an assembly for automatically inserting an angle plate into the duct at each end of the duct, including at each of the lower and upper heads at least one clamping member for clamping the duct into position on the platen, a feed member for feeding an angle plate into place in a duct flange, at least one press member for pressing an angle plate into the duct flange, a supply hopper for supplying angle plates to the feed member, and at least one crimper member for crimping the flange of the duct over the angle plate after it has been inserted into the duct flange. The apparatus further includes a seam closing assembly for automatically closing a seam of a duct comprising a bender at the top of the apparatus and a bender at the bottom of the apparatus for first closing the top four to five inches of the Pittsburgh seam and the bottom four to five inches of the Pittsburgh seam; and a pair of vertical support members constructed and arranged outside the work area of the assembly for automatically inserting the angle plate, a seam closing carriage connected to the vertical support members and having a horizontal member with a housing having a seam forming member, and means for moving the seam closing carriage up and down the vertical support members. When a duct is clamped in position, the seam closing assembly will automatically close the duct seam by first closing the top and bottom four to five inches of the seam and then closing the remainder of the seam by the seam closing carriage.

These and other objects of the invention will be apparent from the following description of the preferred embodiments of the invention and from the accompanying drawings.

BRIEF DESCRIPTION OF THE DRAWINGS

The following detailed description of the specific non-limiting embodiments of the present invention can be best understood when read in conjunction with the following drawings, where like structures are indicated by like reference numbers.

Referring to the drawings.

DETAILED DESCRIPTION OF THE PREFERRED EMBODIMENTS

Referring to the Figures, the present invention is directed to new apparatus and methods for (1) automatically closing the seam of a duct, and (2) automatically inserting angle plates into duct flanges and automatically closing the seam of a duct. The apparatus and method for automatically closing the seam of a duct will be described first (not shown). It will be described with respect to closing a Pittsburgh seam. The apparatus and method can be similar to the CORNERMATIC® Combo Machine without the corner insertion components but will further comprise a bender at the top and bottom of the apparatus for first closing the top and bottom four to five inches of the seam and thereafter closing the remainder of the seam. The bender 400 is shown, for example, in FIG. 7. The bender 400 comprises a rocker 402 for bending and closing the seam; saddle 404 for holding the rocker; piston 406; an hydraulic cylinder 408; and guide rods 410. Hydraulic cylinder 408 moves the piston 406 and guide rods 410 back and forth to move the rocker into position to close the seam of a duct. A bender useful for the invention is sold by Ready Technologies under the trademark Ready Bender®. Thereafter, the remainder of the seam is closed as discussed hereafter.

The second apparatus and method of the invention is a combination corner inserter and seam closer. The apparatus is similar to the CORNERMATIC® Combo machine and includes a bender at the top and bottom of the machine for first closing the top and bottom four to five inches of the Pittsburgh seam that the CORNERMATIC® Combo machine cannot close. The bender is the same as disclosed above for the seam closing apparatus and discussed below.

The apparatus 10 is a dual head apparatus, the lower and upper heads being substantially similar. For ease of reference, the lower head assembly will be described with the understanding that the upper head is substantially similar, except when otherwise indicated. The apparatus includes a platen 20 for receiving a duct D. The duct D shown, for example, in FIGS. 1 and 5 has a duct flange and may be a TDC or TDF duct flange or similar duct flange. Other ducts without flanges may be seamed such as a slip on connector; and slip and drive duct work. The apparatus includes guide posts 22 and guide bars 24 for positioning the duct in position. It is understood that a work table will be placed adjacent to the machine for working with the duct and the angle plate insertion and duct seaming, or the machine may be built into the ground of a fabricator's workshop. The apparatus further includes clamping members 30 and 32 for clamping the duct into position; a feed member 60 for feeding an angle plate into place in the duct flange; press members 70 for pressing an angle plate into the duct flange; and an angle plate support hopper 90 for receiving a plurality of angle plates, e.g. in a STRAP-PAK® package, or other angle plate supply assemblies for supplying angle plates to the feed member; and crimper members (not shown) for crimping the duct flange after the angle plate has been inserted into the duct. These foregoing members are used for automatically inserting angle plates into the duct work and for also holding the duct work in position for automatically seaming the duct. As previously stated, in a preferred apparatus and method, the duct work first has angle plates inserted into a duct flange at each of the top and bottom corners of the duct, i.e. a dual head angle plate inserter apparatus (angle plates are also known as "corners" in the industry). Thereafter, the apparatus and method will close the seam of the duct, e.g. a Pittsburgh seam, although other types of seams may be closed using the apparatus and method of the invention.

The angle plate insertion mechanisms of the apparatus may be generally as disclosed in the commercial CORNERMATIC® Combo machine; Systemation's U.S. Pat. Nos. 9,027,376 and 5,283,944; the CORNERMATIC® PLUS™ machine; Systemation's U.S. Pat. Nos. 8,875,388; 9, 151, 513; and 9,937,592 or combinations of these disclosures, which disclosures have been incorporated in their entirety herein by reference and may not be repeated in detail herein.

The primary components of the apparatus are discussed in greater detail hereafter with reference to the lower head of the apparatus, the upper head being substantially the same, and include a platen 20, clamping members 30 and 32 for clamping the duct in position; a feed member 60 for feeding an angle plate into place in the duct flange; press members 70 for pressing an angle plate into the flange; an angle plate supply hopper 90 for receiving a plurality of angle plates for supplying angle plates to the feed member from, for example, an angle plate package inserted into the supply hopper; and crimper members (not shown) for crimping the duct flange after the angle plate has been inserted into the duct flange. These components of the invention will be discussed in greater detail below.

The platen 20 includes guide posts 22 and guide bars 24 for positioning the duct in place in the machine. Guide posts 22 are fastened adjacent to the platen 20. As stated above, the apparatus may seam both duct work having duct flanges (which require angle plate insertion) such as TDC and TDF duct work or duct work not having duct flanges (which do not require angle plate insertion) such as a slip on connector or slip and drive duct work. With duct work having flanges, the flanges contact the guide posts 22. For duct work with and without flanges, the duct sides contact the guide bars 24. The guide bars 24 may include proximity sensors which indicate that a duct is in position and starts the angle plate insertion process as discussed below. Additionally, the apparatus may include light beam bars which include a light beam source and a light beam receiving member for generating a light beam to sense when a duct is in place and not seamed as the open ended female edge portion breaks the light beam, e.g. a fiber optic light beam. The machine, therefore, knows that the seam needs to be closed after the angle plate insertion operation. It is understood that other means for detecting the open-ended female edge portion may be used or a manual means for engaging the seam closing assembly may be used.

With respect to the clamp members 30, the clamp member 30 includes a clamp arm for clamping the duct work in place. There are two clamp members 30 which function the same and clamp adjacent flanges of a duct. The clamp arm includes a clamp head and clamp finger which engages the duct flange. The clamp arm is connected to a clamp block by a pin upon which the clamp arm pivots. The clamp 30 is attached to an air cylinder 40. A piston moves the clamp arm from an unclamped to a clamped position. The clamp members 30 are triggered to clamp the duct work in place by proximity sensors. When the duct sides engage proximity sensors, the proximity sensors signal the start of the angle plate insertion process causing air cylinder 40 and piston to move the clamp arms downward and clamp the duct flange into position. During the clamping process, the clamp members 30 pull the flange of the duct outward and will also straighten out any duct flange which has been deformed. This provides for easier receipt of an angle plate into the duct flange. More specifically, the clamp members 30 pull the duct into place and then clamps the duct into position for receiving the angle plate. In doing so, it flattens out the flanges so that there is no interference between the duct flange and the feeding of the angle plate to the duct flange. The clamp members 30 also open up the area of the channel which allows for easier placement of an angle plate into the flange.

Figure 2:
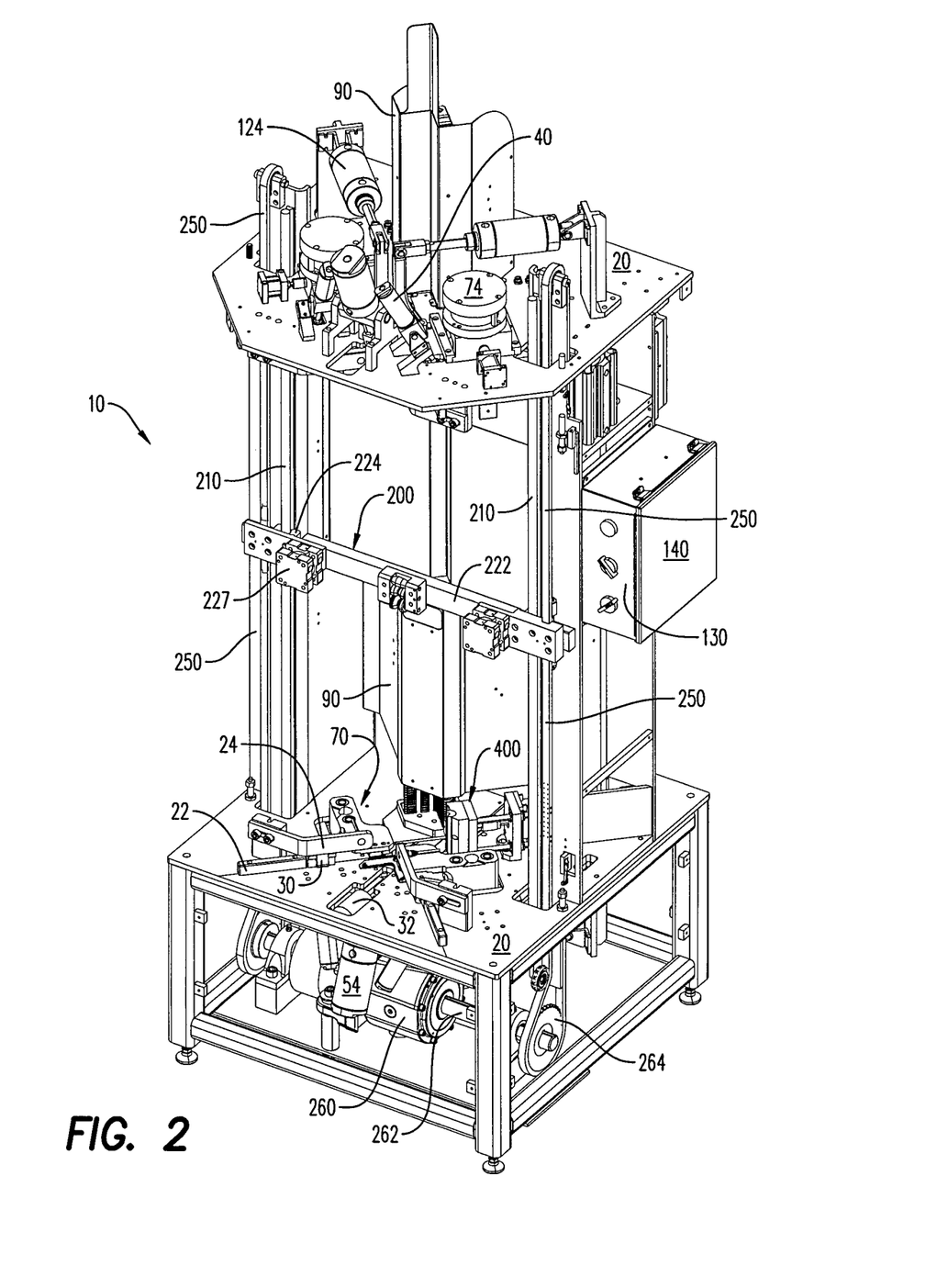
FIG. 2 is another front and side perspective view of FIG. 1.
Figure 3:
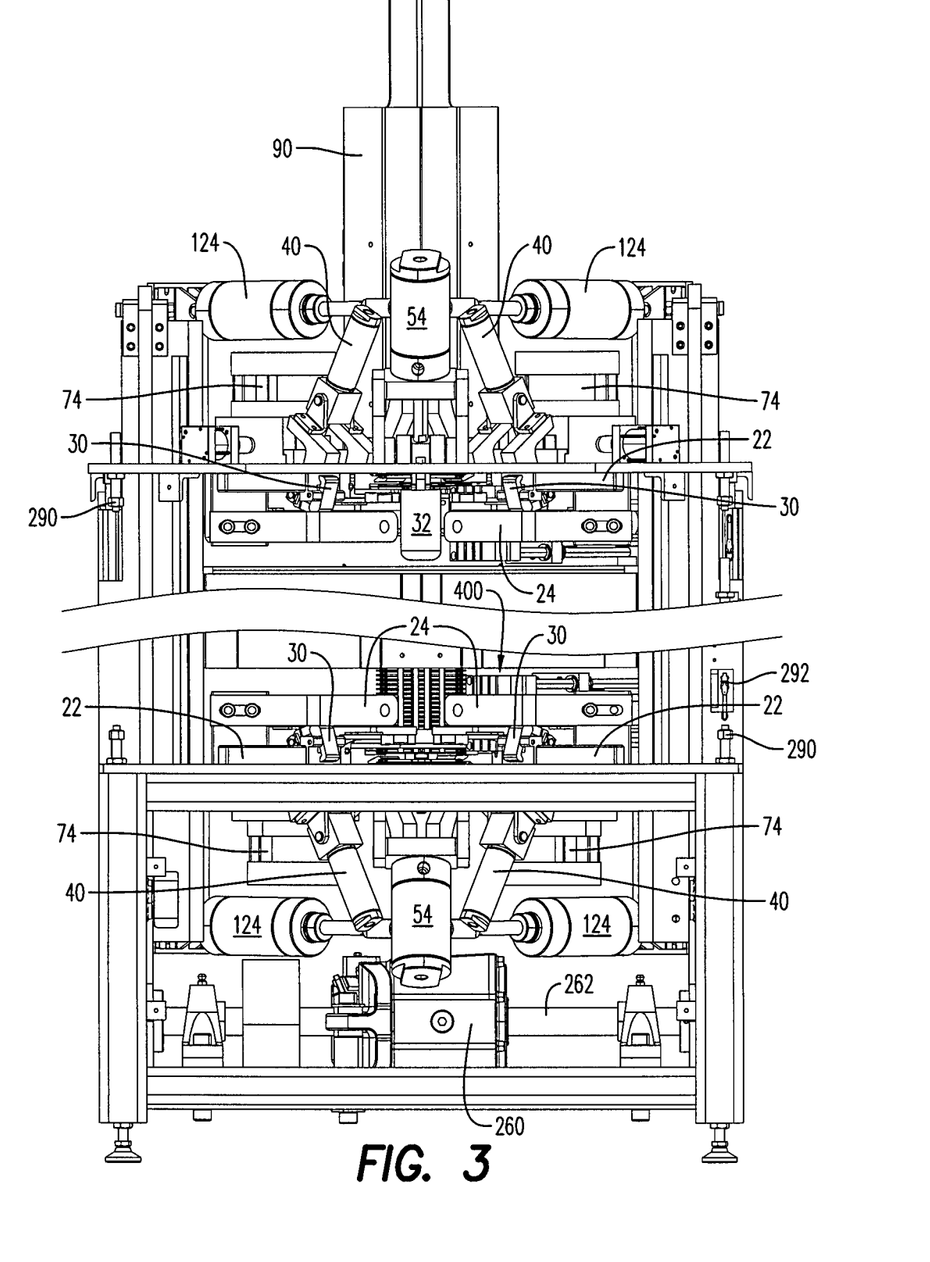
FIG. 3 is a partial enlarged view of the top and bottom heads of FIG. 1.

Referring to FIGS. 2 and 3, there is shown a second clamping member 32. This clamping member 32 clamps the duct work into place on the inside of the duct. Clamping member 32, in conjunction with clamping members 30, secures the duct in place. Clamping member 32 is shaped in a cylindrical configuration to avoid tearing insulation or other materials adhered to the inside of the duct. Similarly, other radius configurations may be used.

The feed member 60 feeds the angle plate into the duct flange. The feed member 60 slides forward and has a V-shaped member which engages an angle plate and moves the angle plate into engagement with the duct flange. The feed member 60 is operated by an air cylinder having piston rods connected to feed plate 60. The operating stroke of the piston rods and feed plate 60 push an angle plate from the bottom of the stack of angle plates to engage an adjacent corner of a duct and overlying the two adjacent duct channel flanges.

The angle plate useful in the invention and in the packaging discussed hereafter is as disclosed in, for example, U.S. Pat. No. 5,342,100, and sold commercially by Ductmate Industries, Inc. under the trademark CORNERMATIC®. A presently preferred package of angle plates is disclosed in Systemation's U.S. Pat. Nos. 9,545,695 and 9,377,213 and sold by Ductmate under the trademark STRAP-PAK®.

Referring to FIGS. 2 and 3, the apparatus includes press members 70 adjacent to each side of the duct work. The pressers 70 will press the angle plate down into position in the duct flange. Preferably, the pressers 70 will press the angle plate axially. Referring, for example to FIG. 3, there is shown an air cylinder 74 of the press member 70. The air cylinder 74 has a piston rod for moving the press head of the pressers 70 for pressing an angle plate. The press head includes a press wedge for contacting the angle plate and pressing the angle plate into the flange.

The apparatus includes crimper members (not shown) for crimping the duct flange to hold the angle plate in the flange. The crimper mechanism is generally as disclosed in U.S. Pat. No. 5,283,944. The crimper members extend upwardly through an opening in the platen 20. Each crimping member is carried by an angle lever which is pivotally mounted on a pivot pin. The angle lever is connected to an air cylinder 124 having a piston rod for movement of the angle lever. The crimper member includes a crimper arm for engaging and crimping the duct flange.

As previously stated, the above description has generally referenced the angle plate inserter components in relation to the lower head assembly. The components are substantially similar for the upper head and will not be repeated in detail herein. The upper head is shown in FIGS. 1-4.

Figure 1:
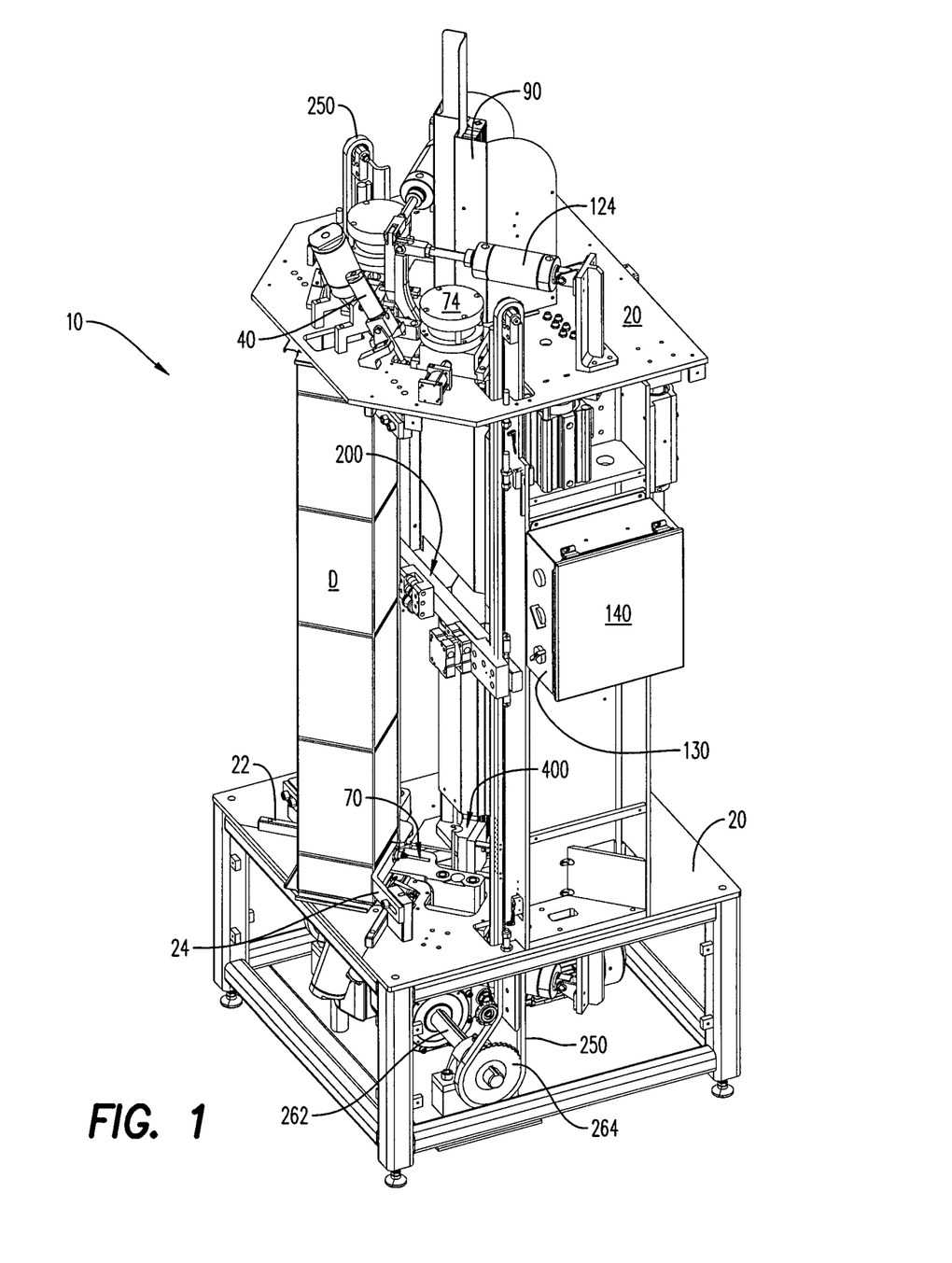
FIG. 1 is a front and side perspective view of the apparatus of the invention.

Referring to FIGS. 1 and 2, there is generally shown a pneumatic control panel 130. This panel includes air regulators and a pneumatic manifold with control valves for operating the air cylinders for the upper and lower heads of the apparatus. Each valve has a manual override which can be used for setup and maintenance. The control panel includes incoming air supply regulators; incoming air supply regulator gauges; valves for the benders; valves for the clamping members 30; valves for clamping members 32; valves for the feed members 60; valves for the presser members 70; and valves for the crimping members. Each valve has a manual override valve. It is understood that the apparatus may also be operated by electrical controls or other means known to those skilled in the art.

Figure 4:
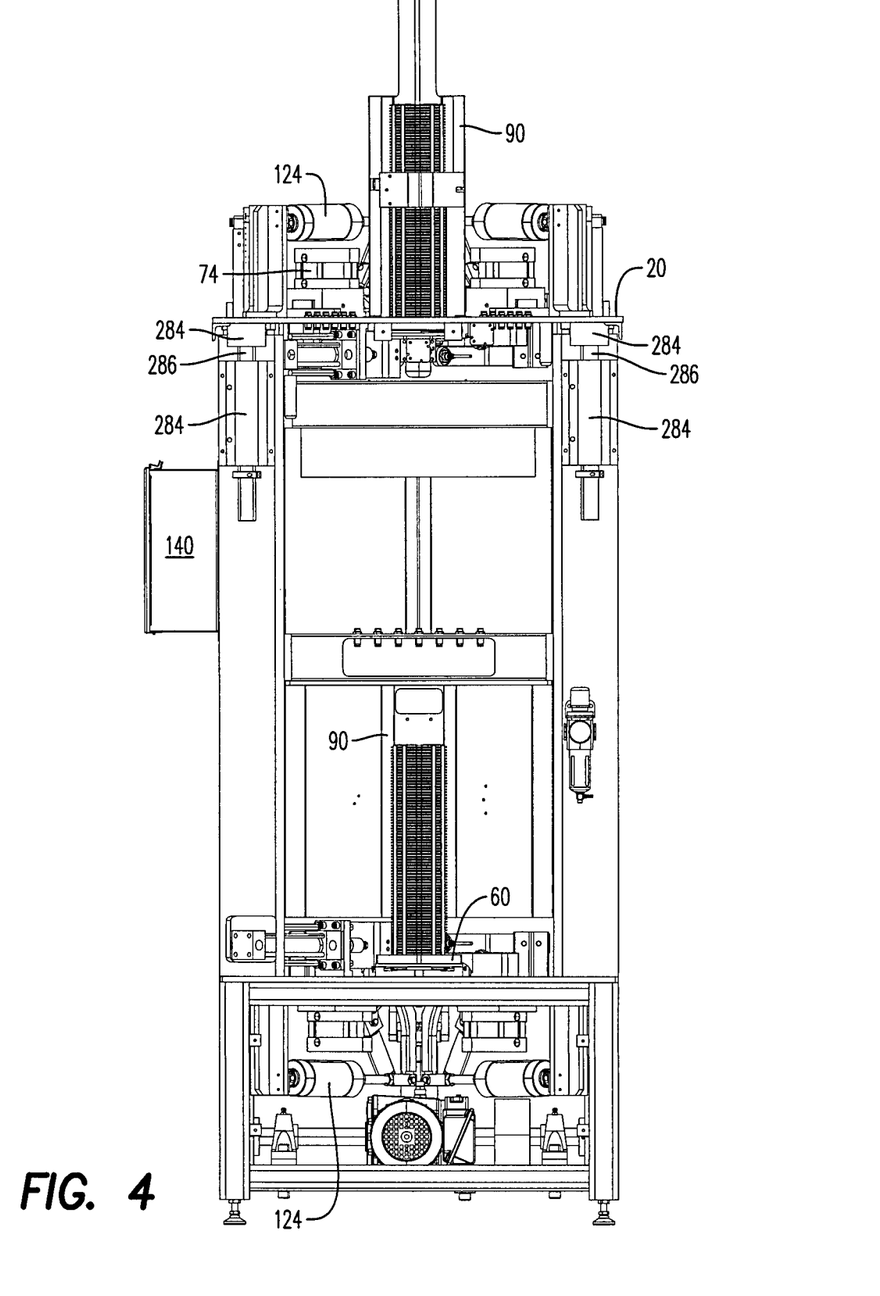
FIG. 4 is a back view of FIG. 1.

FIG. 4 also shows upper platen 20 which is adjustable to accommodate different size duct. Platen 20 adjusts by an air piston and piston rods and includes a support member 284 at the rear of the machine through which rod 286 moves up and down.

The operating sequence of the machine, as discussed hereafter, is controlled by a programmable logic control (PLC) which may be located in an electrical enclosure 140 on the machine. The machine may operate with a standard 220 VAC outlet circuit. When the machine is plugged into a power source, power may be applied to the system and the PLC by pressing on a power on push-button switch. Power may be removed by pressing a power off push-button switch. The machine operation may be controlled by a series of inputs within the PLC. As discussed below, the sequence is activated by the proximity sensors that connect to inputs of the PLC. Once these inputs are activated, the sequence of the corner insertion begins and steps through to completion as discussed hereafter. When duct work without flanges are to be seamed, the control panel includes a separate control for operation of the seam closing assembly.

In the angle plate insertion operation, the duct fitting will be placed on the platen 20 of the apparatus and pushed against guide posts 22 and guide bars 24 where it will engage proximity sensors. This causes the clamp members 30 and 32 to clamp the duct work into place. During the clamping stage, the clamps 30 will pull the flange of the duct outward and straighten out the flange for easier receipt of the angle plate. The clamp will also pull the duct in place and then flatten the flanges so that there is no interference of the duct during the angle plate feed cycle. This also widens out the flange and allows for easier integration of the angle plate into the flange. Clamp 32 pivots upward and further positions the duct. Once the duct fitting is clamped in place, feed members 60 moves an angle plate into place in the duct flange. Once the angle plate is in place, press members 70 will axially press the angle plate down into position in the duct flange. Once the angle plate is pressed into place, the crimpers will cause the crimping arms to crimp the flange over the angle plate to hold the angle plate in the flange. An angle plate is inserted in the lower and upper ends of the duct. The duct may require anywhere from one to four seams. The assembly for seaming will engage when a light beam senses that there is a non-seamed corner of the duct in position for seaming.

Figure 5:
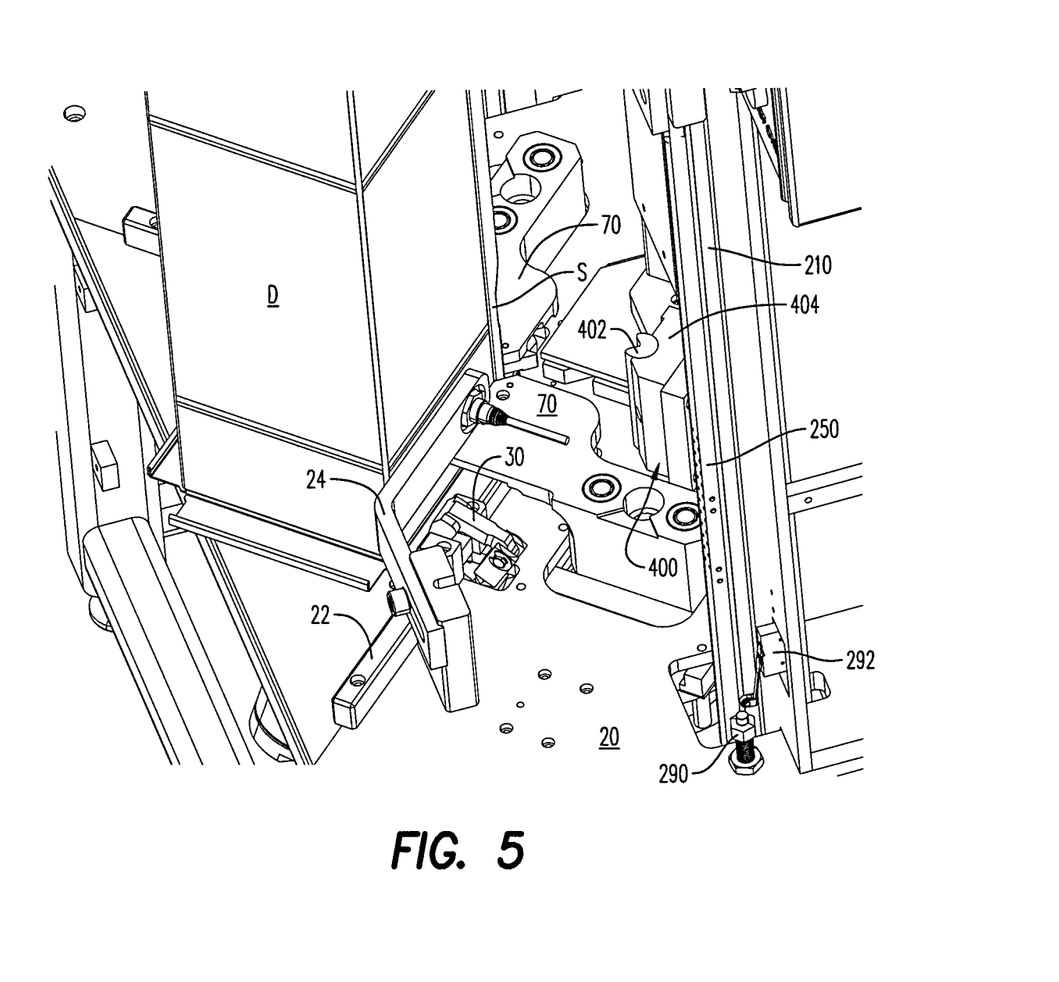
FIG. 5 is an enlarged view of the bender in relation to the duct in the apparatus.
Figure 6:
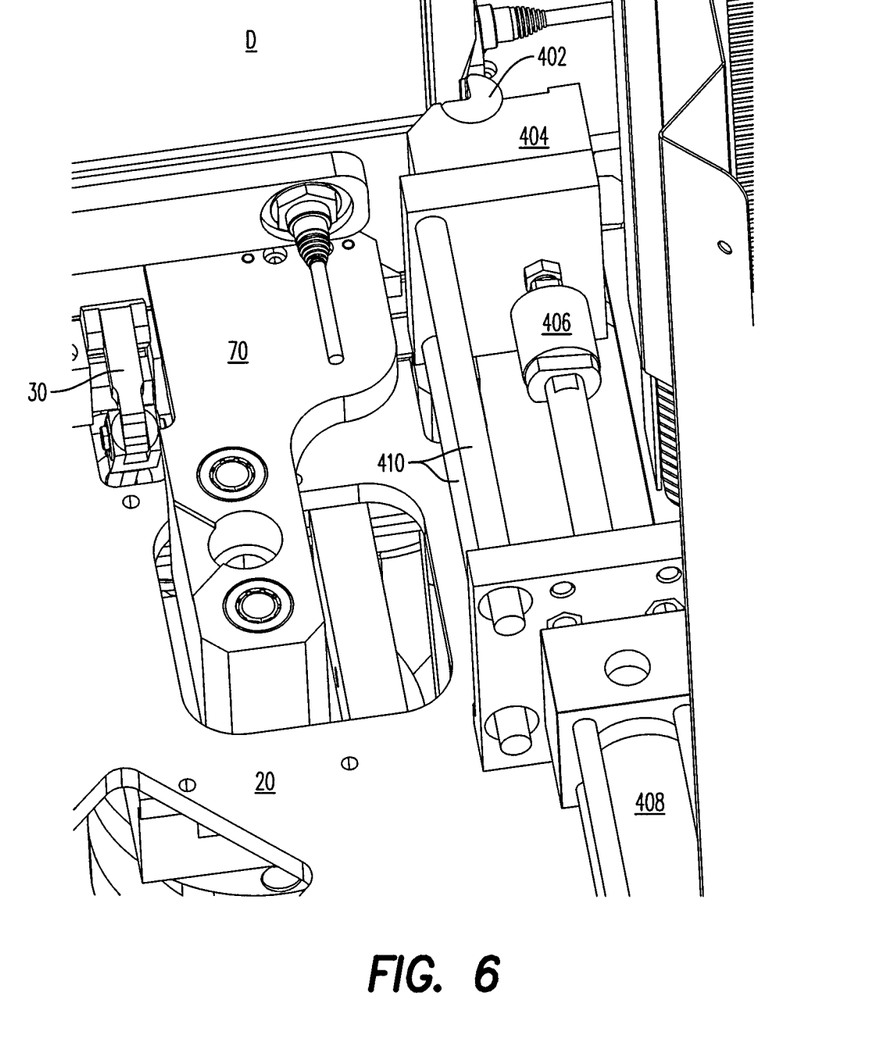
FIG. 6 is a view of the bender closing the lower seam of the duct.
Figure 7:
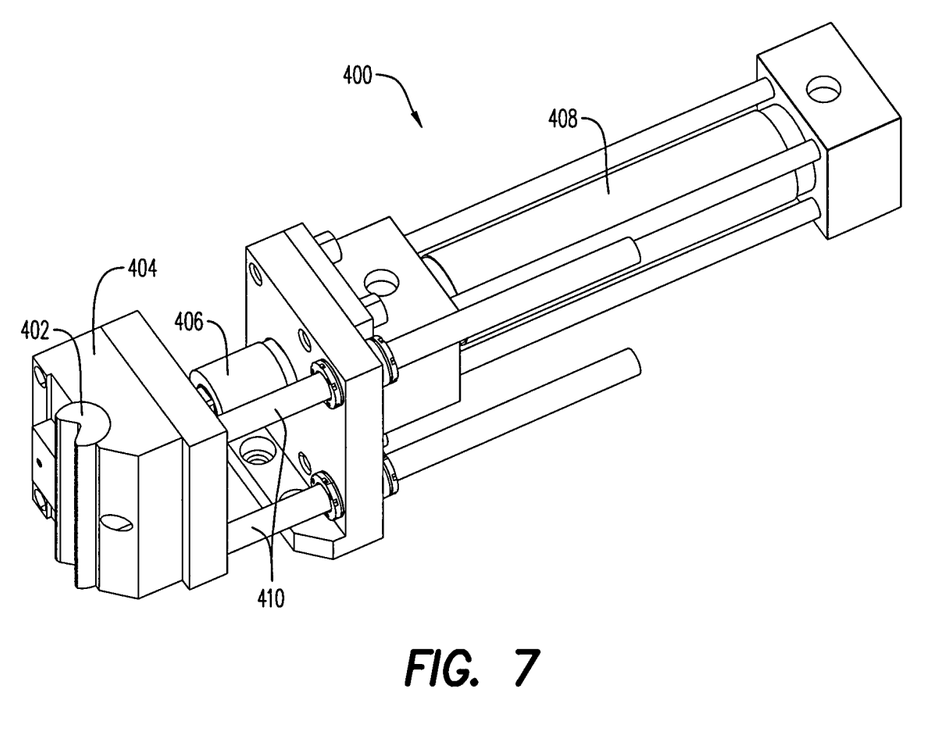
FIG. 7 is a perspective view of the bender.
Figure 8:
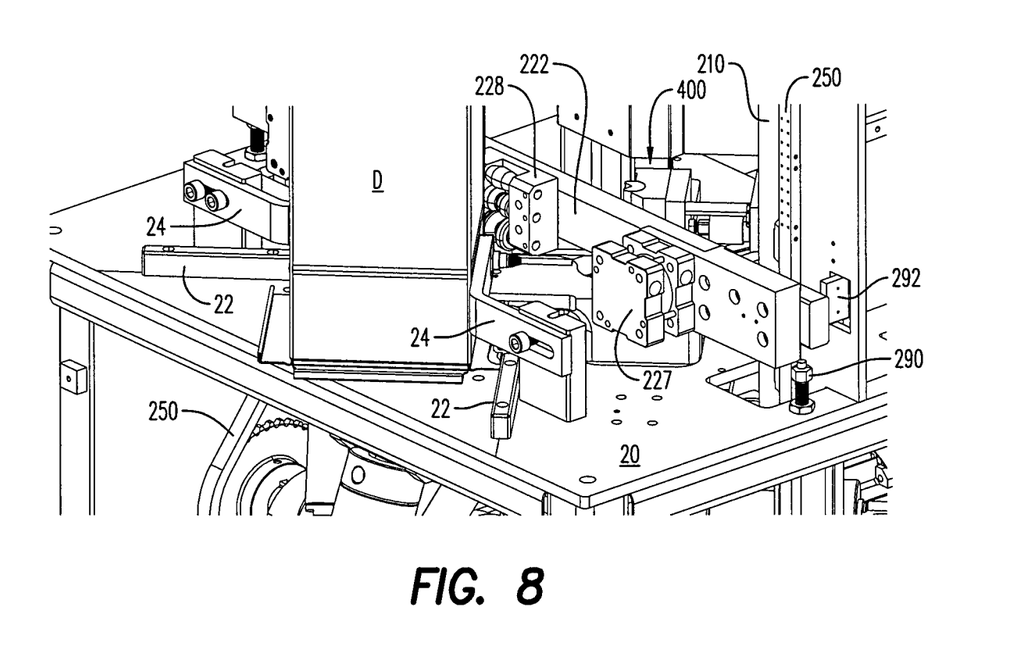
FIG. 8 is an enlarged view of the carriage with the rollers in relation to a duct for closing the seam of the duct.

The apparatus 10 further includes a seam closing assembly comprising (1) first and second benders 400 for first closing the top and bottom four to five inches of the seam, and (2) a carriage assembly 200. The benders 400 are as discussed above and shown in FIG. 7. Referring to FIGS. 5-7, the operation of bender 400 for the lower head of the apparatus will be described, the upper head functioning in substantially the same way. Referring to FIG. 5, duct D is held in place on platen 20 by clamping members 30 and 32. Bender 400 is bolted to the platen 20. Rocker 402 of bender 400 is shown prior to seaming the lower four to five inches of the Pittsburgh seam S. Referring to FIG. 6, the bender 400 is actuated and hydraulic cylinder 408 moves piston 406 on guide rods 410 and rocker 402 engages seam S and closes the seam at the lower four to five inches of the seam. Thereafter, the remainder of the seam is closed by seaming assembly 200.

The carriage assembly 200 includes support members 210 which provide support for a seam closing carriage 220 for closing the remainder of the seam. The seam closing support members 210 may be linear rails. The support members are attached to the frame of the apparatus by suitable fasteners such as bolts (not shown). The seam closing carriage 220 includes a horizontal bar 222. Bar 222 includes guide members 224 which ride on support members 210 and chain members 226 for connecting chain drives at the ends of the bar 222. Bar 222 includes a seam closing carrier including a housing 228 having a seam forming member. Bar 222 further includes air cylinders 227 that move bar 222 and the seam closing carriage 220 back to clear the female duct flange of the Pittsburgh seam when the duct D is loaded into the machine. In the prior art CORNERMATIC® Combo Machine, the flange is bent over by a worker with a hammer. The seam closing carriage 220 moves vertically on linear rails 210. The seam closing carriage moves by endless chain drives 250. Referring, for example, to FIG. 3, the chain drives 250 are moved by an electric motor 260 having a drive shaft 262 and drive sprockets 264 engaging each chain drive 250.

As seen in FIG. 4 and discussed above, the apparatus 10 includes an adjustable upper head which will move up and down by the piston member and include supports 284 at each side of the rear of the machine for vertical movement of rods 286. For example, a slip on connector or slip and drive duct work is generally longer than flanged ducts and the upper head must be raised to accommodate this type of duct work.

The assembly further includes at the lower and upper heads bolts 290 to mechanically stop the carriage and electrical switch 292 which the carriage will contact to electrically stop the carriage. Bolts 290 are attached to the platens 20.

Figure 9:
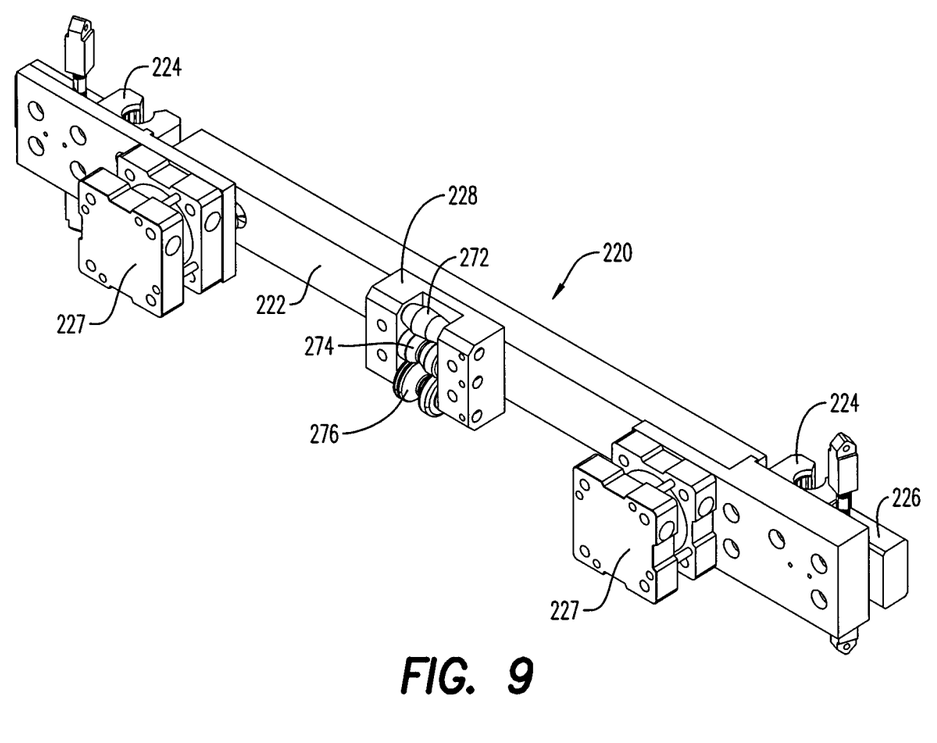
FIG. 9 is a perspective view of the carriage.
Figure 10:
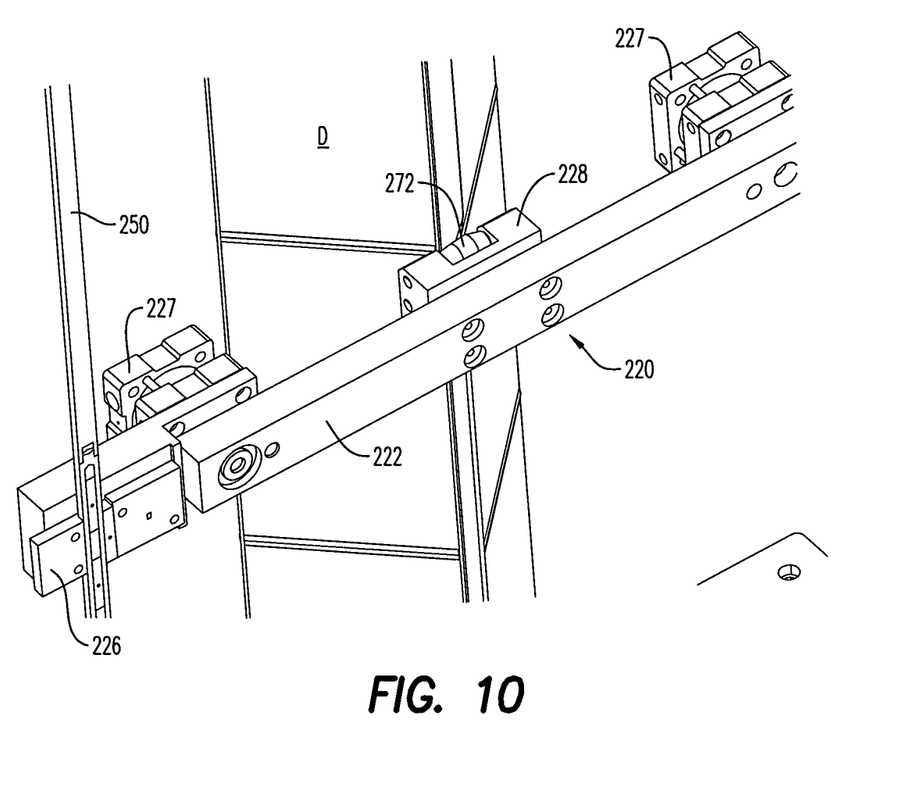
FIG. 10 is a perspective view of the carriage in relation to a duct for closing the seam of the duct.

A housing 228 is connected to the horizontal bar 222 as shown, for example, in FIGS. 9 and 10.

Referring to FIG. 9, the rollers are attached to the housing 228 by pins and will rotate. The housing 228 includes seam forming members which include a first roller 272 having a straight surface; a second roller 274 having about a 120 to 145 degree V-shape, 135 degrees is shown and preferred; and a third roller 276 having about an 85 to 90 degree V-shape, 88 degrees is shown and preferred. These seam forming members will form or close the seam of the duct as discussed below. The duct may be placed in the apparatus in any orientation and the seaming assembly will close the duct seam. In the alternative to roller members, the carriage may use cam followers for closing the seam.

In operation, after the corners are inserted into the flanges of the duct (assuming a duct having flanges), the clamping members will hold the duct into position. When an unseamed duct corner is sensed by a light beam, the seaming operation takes place. First, the top and bottom benders 400 are actuated to close the top and bottom four to five inches of the seam as described above. Next, the carriage assembly 200 will start the seaming operation from the bottom of the machine and move up along linear rails 210 by chain drive members 250. The seam forming members 272, 274 and 276, will close the Pittsburgh seam as shown in FIG. 10. Roller 272 will first engage the edge of the female seam member and bend the seam approximately forty-five degrees. Thereafter, the second roller 274 will further bend the edge of the female seam member. Thereafter, roller 276 will further bend the edge of the female seam member ninety degrees to complete the closing of the seam. The carriage will then move back down to provide a smooth and clean finish to the duct seam.

Alternative seam forming members are shown in U.S. Pat. No. 9,027,376 which has been incorporated herein by reference. It is understood that other seam forming members may be used without departing from the scope of the invention, e.g. cam followers.

The exemplary embodiments herein disclosed are not intended to be exhaustive or to unnecessarily limit the scope of the invention. The exemplary embodiments were chosen and described in order to explain the principles of the present invention so that others skilled in the art may practice the invention. As will be apparent to one skilled in the art, various modifications can be made within the scope of the aforesaid description. Such modifications being within the ability of one skilled in the art form a part of the present invention and are embraced by the appended claims.

The invention claimed is:

1. An apparatus for automatically inserting angle plates into a duct flange and for automatically closing a seam of a duct comprising
   (a) a dual head assembly having a lower head and an upper head wherein each head includes a platen for receiving a duct and an assembly for automatically inserting an angle plate into the duct flange; and
   (b) a seam closing assembly for automatically closing a seam of the duct comprising (1) a first bender at the lower head and a second bender at the upper head, the first and second benders adapted to first close the top and bottom portions of the seam; and (2) a carriage assembly comprising a pair of vertical support members constructed and arranged outside of the work area of the assembly for automatically inserting an angle plate, a seam closing carriage connected to the vertical support members and having a seam forming member, means for moving the seam closing carriage up and down the vertical support members, the seaming assembly adapted to close the remaining portion of the seam; wherein when a duct is positioned in the apparatus, the assembly for automatically inserting an angle plate will automatically insert an angle plate in the duct flange and the seam closing assembly will automatically close the duct seam.

2. The apparatus of claim 1 wherein the assembly for automatically inserting an angle plate into the duct flange comprises at least one clamping member for clamping the duct into position on the platen, a feed member for feeding an angle plate into place in the duct flange, at least one press member for pressing an angle plate into the duct flange, a supply hopper having a plurality of angle plates for supplying angle plates to the feed member, and at least one crimper member for crimping the flange of the duct over the angle plate after the angle plate has been inserted into the duct flange.

3. The apparatus of claim 1 wherein the benders comprise a rocker for bending and closing the seam; a saddle for holding the rocker; a piston; an hydraulic cylinder; and guide rods, wherein the hydraulic cylinder moves the piston and guide rods back and forth to move the rocker into position to close the seam of the duct.

4. The apparatus of claim 1 wherein the apparatus is adapted to first insert angle plates in the duct flange and then close an open seam of the duct.

5. The apparatus of claim 4 wherein the lower head and the upper head each include a pair of light bars and a first of said light bars includes a light source and a second of said light bars includes a means for detecting the light source.

6. The apparatus of claim 1 wherein at least the lower head or the upper head includes a pair of light bars adapted to sense the presence of an unseamed duct corner.

7. The apparatus of claim 1 wherein said seam closing carriage comprises a horizontal bar having means for riding on said vertical support members.

8. The apparatus of claim 1 wherein said seam closing carriage comprises a horizontal bar having at least one air cylinder adapted to move the horizontal bar and the seam closing carriage away from the unseamed duct.

9. The apparatus of claim 8 wherein the horizontal bar further includes means for attaching an endless chain drive at each end of the horizontal bar.

10. The apparatus of claim 1 wherein the seam forming members are selected from the group consisting of a plurality of roll forming members and cam followers.

11. The apparatus of claim 10 wherein the plurality of roll forming members comprises three roll forming members in vertical relation, the upper-most roll forming member having a flat area, the center roll forming member having a V-shape member; and the lower-most roll forming member having a V-shape, wherein the plurality of roll forming members are adapted to close the duct seam no matter the orientation of the duct.

12. The apparatus of claim 1 wherein the platen includes guide posts and guide bars for positioning the duct.

13. The apparatus of claim 12 wherein the guide bars include proximity sensors adapted to sense the position of the duct and to begin the sequence of the angle plate insertion.

14. The apparatus of claim 2 wherein the at least one clamping member comprises a pair of clamping members adapted to clamp the duct flange and to lock the flange in place.

15. The apparatus of claim 2 wherein the at least one clamping member comprises a clamp which pivots from the underside of the platen to engage the inside of the duct to hold the duct in place.

16. The apparatus of claim 1 wherein the upper head is adjustable and the apparatus is adapted to receive different lengths of duct.

17. The apparatus of claim 1 wherein the seam closing carriage is adapted to close the duct seam by moving vertically upward on the vertical support members, wherein the seam forming member closes the duct seam.

18. The apparatus of claim 17 wherein the seam closing carriage is further adapted to move vertically downward to further finish the seam closing and return the seam closing carriage to its starting position.

19. An apparatus for automatically closing a seam of a duct comprising (1) a frame having a first end and a second end; (2) a means to hold the duct in the frame; (3) a first bender at the first end of the frame and a second bender at the second end of the frame, wherein the first and second benders are adapted to close first and second end portions of the seam of the duct; and (4) a seam closing carriage for closing the remainder of the seam and having a means for moving the seam closing carriage from one end of the frame to the other end of the frame and having a seam forming member for closing the remaining portion of the seam.

20. The apparatus of claim 19 wherein the benders comprise a rocker for bending and closing the seam; a saddle for holding the rocker; a piston; an hydraulic cylinder; and guide rods, wherein the hydraulic cylinder moves the piston and guide rods back and forth to move the rocker into position to close the seam of the duct.

21. A method for automatically inserting angle plates into a duct flange and for automatically closing a seam of a duct comprising
 (a) inserting a duct having transverse flanges into an apparatus adapted to automatically insert angle plates into the duct flanges and to automatically close a seam of the duct;
 (b) the apparatus including a dual head assembly having a lower head and an upper head wherein each head includes a platen for receiving a duct and an assembly for automatically inserting an angle plate into a duct flange, the assembly for automatically inserting an angle plate into a duct flange including at least one clamping member for clamping the duct into position on the platen, a feed member for feeding an angle plate into place in the duct flange, at least one press member for pressing an angle plate into the duct flange, a supply hopper having a plurality of angle plates for supplying angle plates to the feed member, and at least one crimper member for crimping the flange of the duct over the angle plate after the angle plate has been inserted into the duct flange;
 (c) the apparatus further including a seam closing assembly for automatically closing a seam of a duct comprising (1) a first bender at the lower head and a second bender at the upper head, the first and second benders adapted to close the top and bottom portions of the seam; and (2) a carriage assembly comprising a pair of vertical support members constructed and arranged outside of the work area of the assembly for automatically inserting an angle plate, a seam closing carriage connected to the vertical support members and having a horizontal member with a seam forming member, and means for moving the seam closing carriage up and down the vertical support members for closing the remaining portion of the seam;
 (d) clamping the duct into the apparatus;
 (e) inserting angle plates into the duct flanges; and
 (f) closing the seam of the duct, wherein the first and second benders first close top and bottom portions of the seam and then the seam closing carriage moves vertically on the vertical support members and wherein the seam forming member closes the remainder of the seam of the duct.

22. The method of claim 21 wherein the benders comprise a rocker for bending and closing the seam; a saddle for holding the rocker; a piston; an hydraulic cylinder; and guide rods, wherein the hydraulic cylinder moves the piston and guide rods back and forth to move the rocker into position to close the seam of the duct.

23. The method of claim 21 wherein at least the lower head or the upper head includes a pair of light bars adapted to sense the presence of an unseamed duct corner.

24. The method of claim 21 wherein the lower head and the upper head each include a pair of light bars and a first of said light bars includes a light source and a second of said light bars includes a means for detecting the light source.

25. The method of claim 21 wherein said seam closing carriage comprises a horizontal bar having means for riding on said vertical support members.

26. The method of claim 21 wherein said seam closing carriage comprises a horizontal bar having at least one air cylinder adapted to move the horizontal bar and the seam closing carriage away from the unseamed duct.

27. The method of claim 26 wherein the horizontal bar further includes means for attaching an endless chain drive at each end of the horizontal bar.

28. The method of claim 21 wherein the seam forming members are selected from the group consisting of a plurality of roll forming members and cam followers.

29. The method of claim 28 wherein the plurality of roll forming members comprises three roll forming members in vertical relation, the upper-most roll forming member having a flat area, the center roll forming member having a V-shape member; and the lower-most roll forming member having a V-shape, wherein the plurality of roll forming members are adapted to close the duct seam no matter the orientation of the duct.

30. The method of claim 21 wherein the platen includes guide posts and guide bars for positioning the duct.

31. The method of claim 30 wherein the guide bars include proximity sensors adapted to sense the position of the duct and to begin the sequence of the angle plate insertion.

32. The method of claim 21 wherein the at least one clamping member comprises a pair of clamping members adapted to clamp the duct flange and to lock the flange in place.

33. The method of claim 21 wherein the at least one clamping member comprises a clamp which pivots from the underside of the platen to engage the inside of the duct to hold the duct in place.

34. The method of claim 21 wherein the upper head is adjustable and the method is adapted to receive different lengths of duct.

35. The method of claim 21 wherein the seam closing carriage is adapted to close the duct seam by moving vertically upward on the vertical support members, wherein the seam forming member closes the duct seam.

36. The method of claim 35 wherein the seam closing carriage is further adapted to move vertically downward to further finish the seam closing and return the seam closing carriage to its starting position.

* * * * *